United States Patent
Kline et al.

(10) Patent No.: US 10,552,010 B2
(45) Date of Patent: Feb. 4, 2020

(54) CREATING FREE-FORM CONTOUR REGIONS ON A DISPLAY

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/014,450

(22) Filed: Jun. 21, 2018

(65) Prior Publication Data

US 2019/0391714 A1     Dec. 26, 2019

(51) Int. Cl.
*G06F 3/0484*     (2013.01)
*G06F 3/0481*     (2013.01)
*G06F 3/0488*     (2013.01)

(52) U.S. Cl.
CPC .......... *G06F 3/0484* (2013.01); *G06F 3/0481* (2013.01); *G06F 3/04883* (2013.01)

(58) Field of Classification Search
CPC ... G06F 3/0484; G06F 3/0481; G06F 3/04883
See application file for complete search history.

(56) References Cited

U.S. PATENT DOCUMENTS

2006/0277460 A1* 12/2006 Forstall ............... G06F 16/9577
                                                                  715/234
2008/0148149 A1   6/2008 Singh et al.
2012/0235946 A1*  9/2012 Zotov ................. G06F 3/04883
                                                                  345/173
2013/0311937 A1  11/2013 Kim et al.
2014/0208276 A1   7/2014 Park
2015/0338942 A1* 11/2015 Stone .................... G06F 3/0488
                                                                  345/173
2016/0191842 A1   6/2016 Lee et al.

OTHER PUBLICATIONS

L. Paragano et al., "Streaming Videos with Picture-In-Picture", IPCOM000238789D, Abstract, Sep. 18, 2014, ip.com, 8 pgs.

* cited by examiner

*Primary Examiner* — Mandrita Brahmachari
(74) *Attorney, Agent, or Firm* — Cantor Colburn LLP; Tihon Poltavets

(57) ABSTRACT

Examples of techniques for creating free-form contour regions on a display are disclosed. In one example implementation according to aspects of the present disclosure, a computer-implemented method includes displaying, by a processing device, a first application on a display of a processing system. The method further includes receiving, by the processing device, an input from a user to define a free-form contour region on the display. The method further includes creating, by the processing device, the free-form contour region on the display based at least in part on the input. The method further includes displaying, by the processing device, a second application on the display of the processing system within the free-form contour region while continuing to display the first application on a remaining portion of the display of the processing system that does not include the free-form contour region.

18 Claims, 8 Drawing Sheets

CREATING FREE-FORM CONTOUR REGIONS ON A DISPLAY

BACKGROUND

The present invention generally relates to processing systems for displaying data, and more specifically, to creating free-form contour regions on a display.

A processing system (e.g., a laptop computer, a smartphone, a tablet computer, a desktop computer, and the like) can execute applications that include interfaces presentable to a user of the processing system via a display associated with the processing system. For example, an application for navigation presents a map to a user as a graphical user interface on a display of a processing system. While using the navigation application, the user may desire to view a graphical user interface for another application, such as a media streaming application. This may result in the user switching between the applications or viewing the applications side-by-side in a "split screen" view.

SUMMARY

Embodiments of the present invention are directed to a computer-implemented method for creating free-form contour regions on a display. A non-limiting example of the computer-implemented method includes displaying, by a processing device, a first application on a display of a processing system. The method further includes receiving, by the processing device, an input from a user to define a free-form contour region on the display. The method further includes creating, by the processing device, the free-form contour region on the display based at least in part on the input. The method further includes displaying, by the processing device, a second application on the display of the processing system within the free-form contour region while continuing to display the first application on a remaining portion of the display of the processing system that does not include the free-form contour region.

Embodiments of the present invention are directed to a system. A non-limiting example of the system includes a memory comprising computer readable instructions and a processing device for executing the computer readable instructions for performing a method for creating free-form contour regions on a display. A non-limiting example of the method includes displaying, by a processing device, a first application on a display of a processing system. The method further includes receiving, by the processing device, an input from a user to define a free-form contour region on the display. The method further includes creating, by the processing device, the free-form contour region on the display based at least in part on the input. The method further includes displaying, by the processing device, a second application on the display of the processing system within the free-form contour region while continuing to display the first application on a remaining portion of the display of the processing system that does not include the free-form contour region.

Embodiments of the invention are directed to a computer program product. A non-limiting example of the computer program product includes a computer readable storage medium having program instructions embodied therewith. The program instructions are executable by a processor to cause the processor to perform a method for creating free-form contour regions on a display. A non-limiting example of the method includes displaying, by a processing device, a first application on a display of a processing system. The method further includes receiving, by the processing device, an input from a user to define a free-form contour region on the display. The method further includes creating, by the processing device, the free-form contour region on the display based at least in part on the input. The method further includes displaying, by the processing device, a second application on the display of the processing system within the free-form contour region while continuing to display the first application on a remaining portion of the display of the processing system that does not include the free-form contour region.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
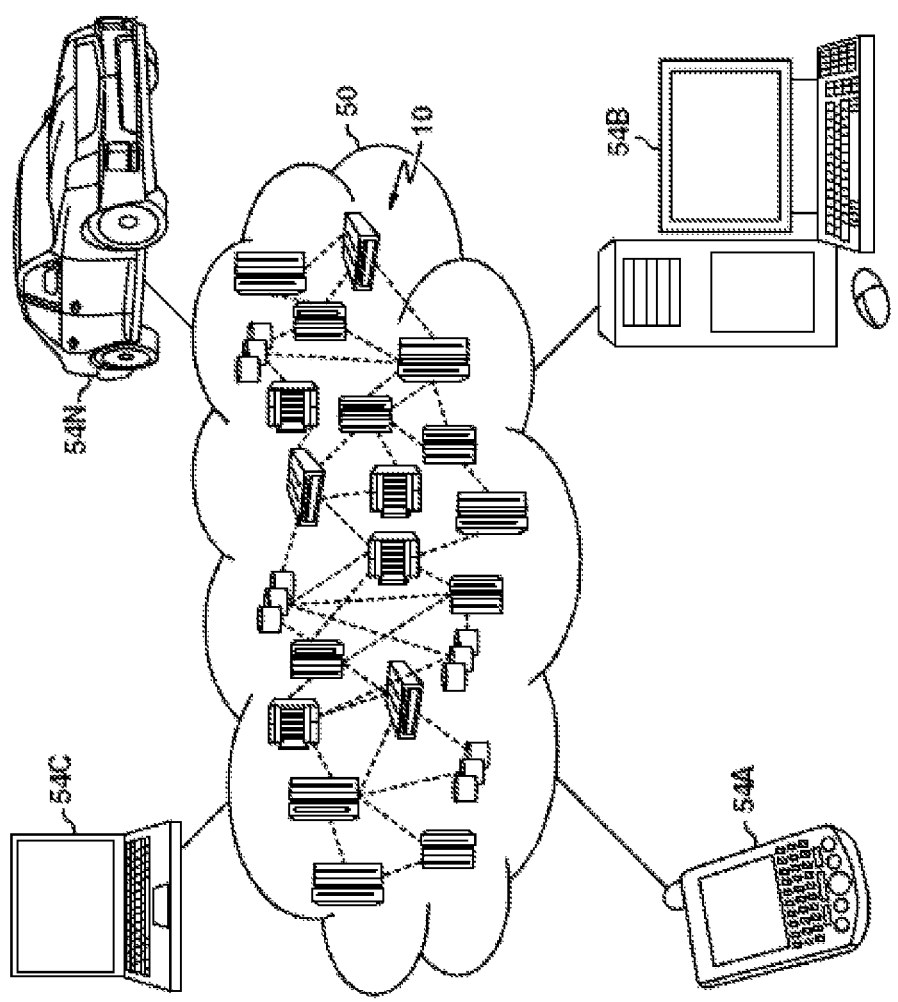
FIG. 1 depicts a cloud computing environment according to one or more embodiments described herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
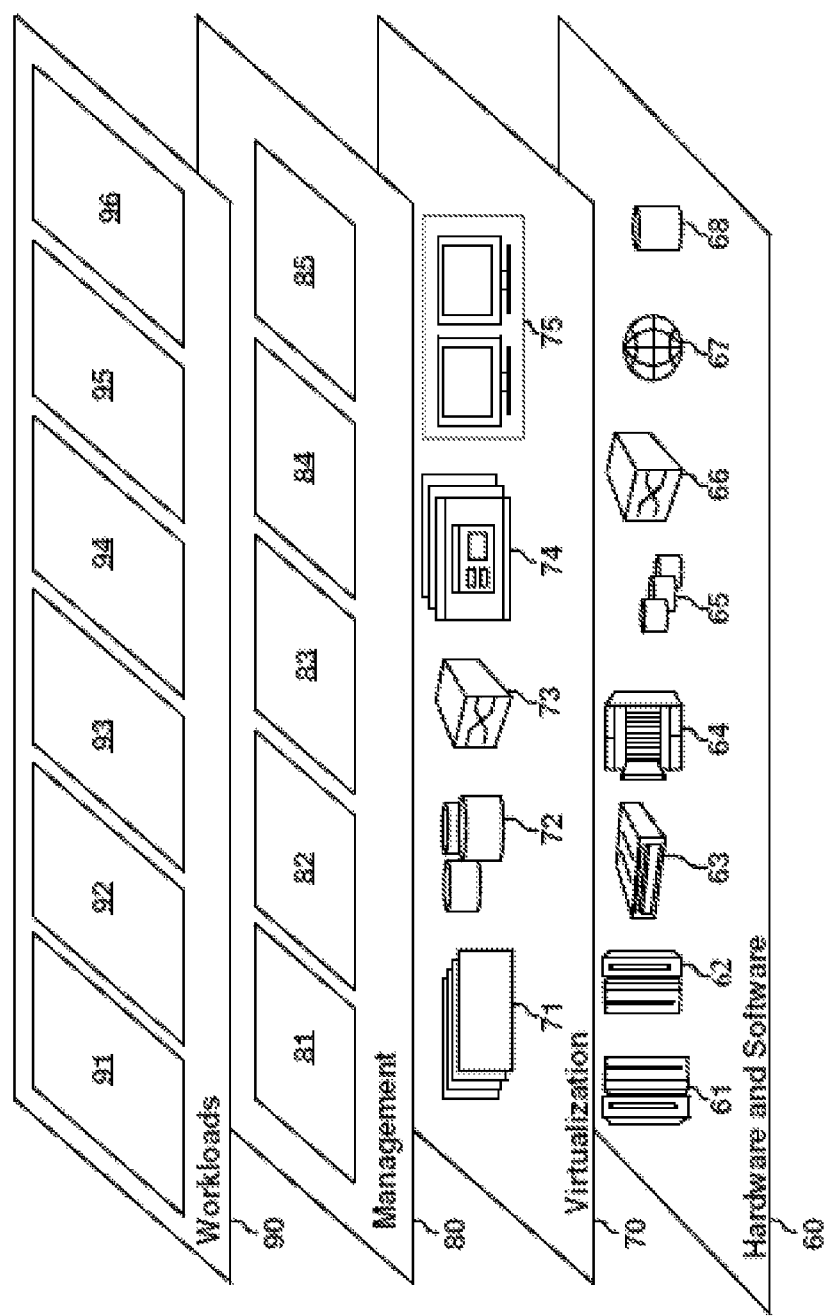
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and displaying data from across the cloud computing environment in a free-form contour region 96.

Figure 3:
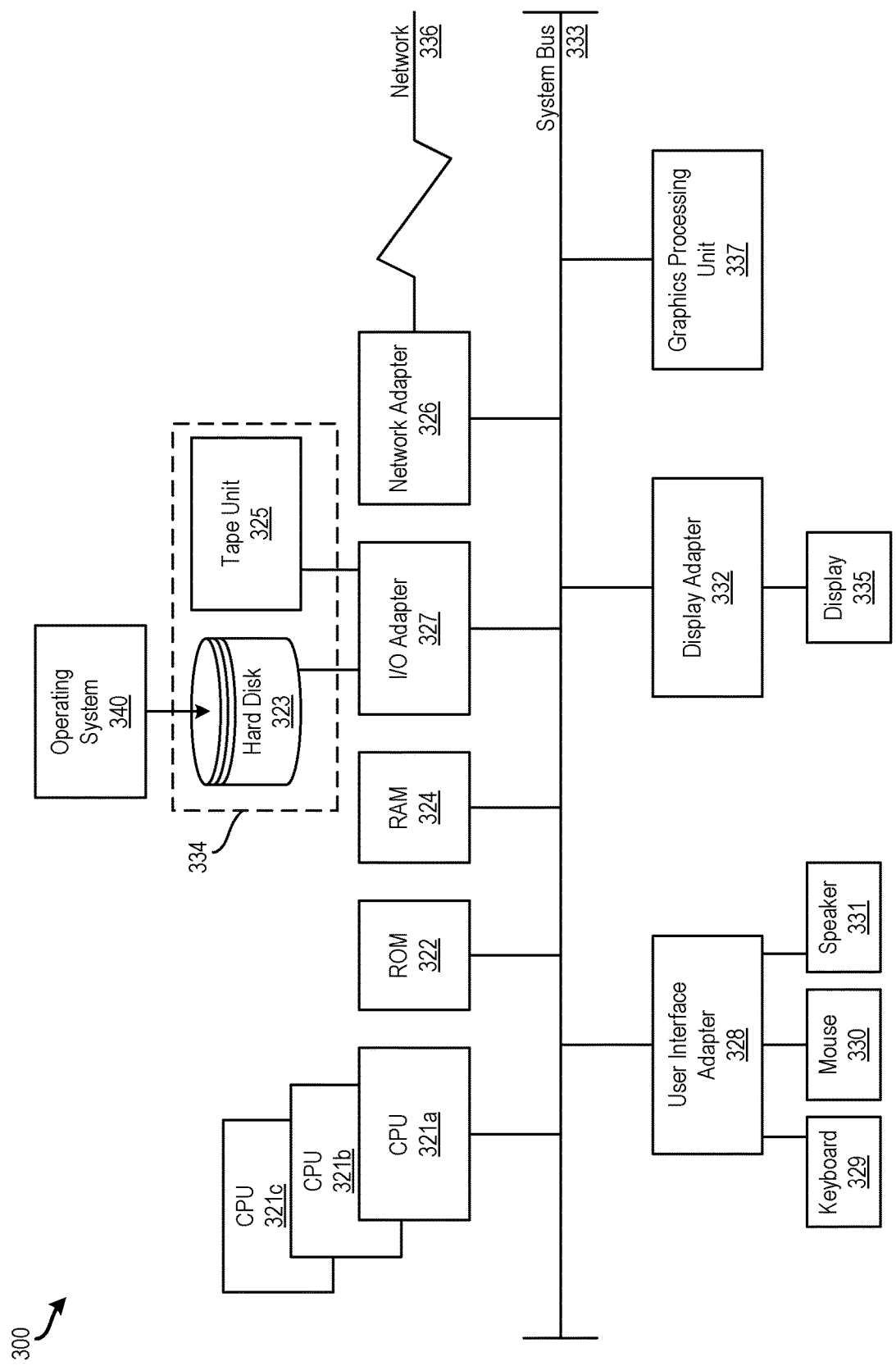
FIG. 3 depicts a block diagram of a processing system for implementing the techniques described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321a, 321b, 321c, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adaptor 332, which may include a graphics adapter to improve the performance of graphics intensive applications and a video controller. In one aspect of the present disclosure, adapters 326, 327, and/or 232 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter

328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Turning now to an overview of technologies that are more specifically relevant to aspects of the invention, a user of a processing system may desire to use multiple applications as the same time and accordingly view graphical user interfaces for the multiple applications. To do this, a user may switch between the applications or view the applications side-by-side. However, existing approaches to presenting multiple applications on a display at the same time are inflexible and not user-definable. For example, split screen views typically apportion the display to each application using pre-configured, standard view options. For example, one application is presented on a left portion of the display and the other application is presented on the right portion of the display.

Turning now to an overview of the aspects of the invention, one or more embodiments of the invention address the above-described shortcomings of the prior art by providing a free-form contour region that is used to display a second application while displaying a first application on a display of the device. For example, the first application is displayed on a display of a processing system. A user then provides an input to define the free-form contour region, which is created based on the input. The second application is then displayed on the display of the processing system within the free-form contour region while the first application is displayed on the display of the processing system (not within the free-form contour region).

For example, to define a free-form contour region, a user can provide input using his finger or a stylus to drawing the free-form contour region on the display. While working on any content (e.g., an application) displayed on the display, the user can draw a free-form contour region based on the user's identified place on the display. The free-form contour region represents an area or region defined by a user (or automatically) that can be many different sizes, shapes, orientations, etc., and provides for displaying an interface of an application therein. When the free-form contour region is drawn on the display, then the user can select another application to be displayed within the area of the free-form contour region. For example, if a user is navigating an electronic map and then the user creates on the electronic map a free-form contour region, the user can select to open a streaming media application, which will be shown within the free-form contour region.

User activity can be monitored and recorded to collect details about the free-form contour regions defined by the user, such as shape, dimension, orientation, location, etc. and what application is selected to be displayed within that free-form contour region. Using, for example, machine learning techniques, it can be identifying what types of applications are being used by the user when performing an activity or what shape of free-form contour region is related to which application that is selected to be displayed within the free-form contour region.

Using historical learning, user's needs can be predicted to automatically display an application within a free-form contour region when the user draws a particular free-form contour region. The mapping of the shape and dimension of any free-form contour region can be mapped to a particular application. For example, if the user draws a circular free-form contour region, then a timing application is shown, whereas for a rectangular free-form contour region, a streaming media application is shown. It can also be predicted how the applications can be paired based on usage history.

The user can split any free-form contour region, for example, by drawing an intermediate line within the free-form contour region, and accordingly, a currently displaying application is shown in one section of the free-form contour region and the new remaining section(s) of the free-form contour region are created. The user can add additional applications in the new section(s). Additionally, the user can move the free-form contour region, change the shape of the free-form contour region (such as with a finger gesture). The application displayed within the free-form contour region is accommodated within the newly available space inside the free-form contour region. The user can also merge multiple free-form contour regions to create a single free-form contour region. For example, while merging, the user can select which application to be removed and which application to be shown in the merged free-form contour region. Self-learning techniques can be used to identify the behavior of merging of contours, and accordingly, an application can be selected automatically when multiple free-form contour regions are merged.

The above-described aspects of the invention address the shortcomings of the prior art by providing an improved interface for displaying a second application on a display of a processing system within a free-form contour region while displaying a first application on the display of the processing system. The improved interface provided herein enables a user to define the free-form contour region such that it is customized for the user and can vary depending on the user's input. This improved interface simplifies existing techniques for displaying multiple applications on a display at the same time and provides. Accordingly, the processing system used to display the applications is improved because the free-form contour region enables multiple applications to be displayed on the display based on a user's input used to define a boundary of the free-form contour region.

Figure 4:
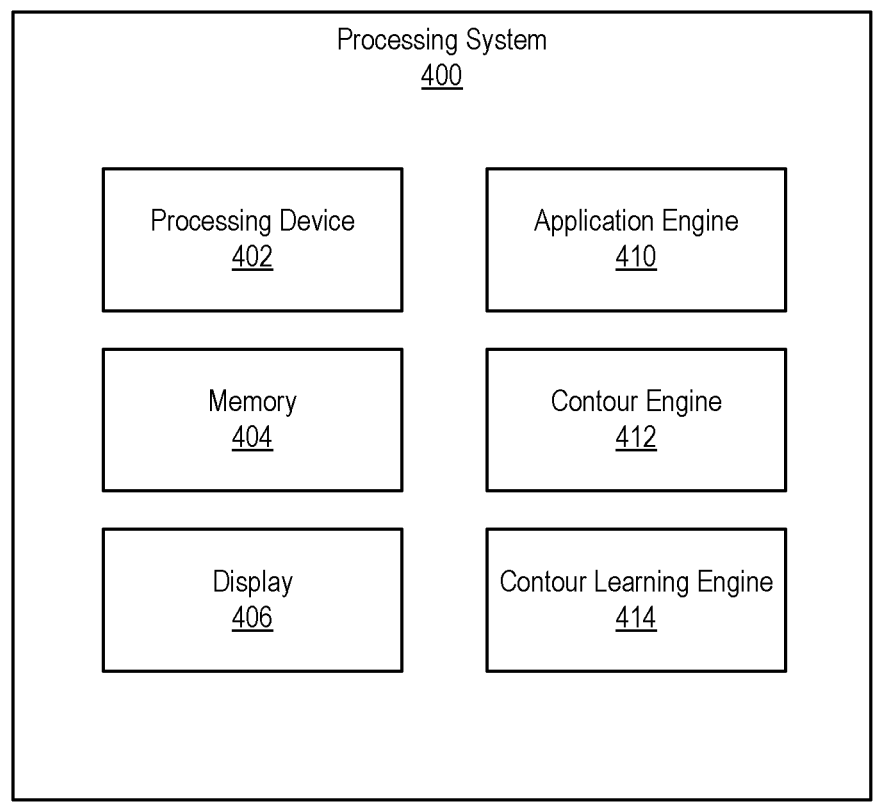
FIG. 4 depicts a block diagram of a processing system for creating free-form contour regions on a display according to one or more embodiments described herein.

FIG. 4 depicts a block diagram of a processing system 400 for creating free-form contour regions on a display 406 according to one or more embodiments described herein. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

In addition to the processing device 402, the memory 404, and the display 406, the processing system 400 includes an application engine 410, a contour engine 412, and a contour learning engine 414. The application engine 410 executes applications and causes a user interface to be graphically presented on the display 406. It should be appreciated that the display 406 can be any suitable display, such as a touch-sensitive display, for displaying information. Examples of applications that can be presented on the display 406 can include, but are not limited to, the following: file management applications, media (i.e., music, video, etc.) streaming applications, mapping/navigation applications, financial applications, word processing applications, text messaging applications, e-mail messaging applications, and many others.

The contour engine 412 receives an input from a user of the processing system 400 and uses the input to define a free-form contour region on an application. By creating the free-form contour region, the user can define an area on the display 406 that is displaying a first application to be used to display a second application. In other words, the second application is displayed on the display 406 within the free-form contour region while the first application is displayed on the display 406 outside of the free-form contour region.

The contour engine 412 can also receive additional inputs from the user to enable the user to alter the size, shape, orientation, etc., of the free-form contour region. Moreover, the contour engine 412 can receive additional inputs from the user to enable the user to define additional free-form contour regions. These additional free-form contour regions can be created within (i.e., nested within) the original free-form contour regions displaying the second application or can be created on the first application, such as for displaying portions of a third application. Accordingly, layers of free-form contour regions can be created within (i.e., nested with) one another (e.g., a first free-form contour region can be nested within a second free-form contour region, which can be further nested within a third free-form contour region, etc.). Additionally, multiple free-form contour regions can be created on the display and/or on the first application. For example, a first free-form contour region is on an upper-right portion of the first application, a second free-form contour region is on an upper-left portion of the first application, and a third free-form contour region is on a lower-middle portion of the first application, etc.

The contour engine 412 can merge two or more free-form contour regions, split a free-form contour region into two (or more) separate free-form contour regions, remove free-form contour regions, etc. In the case of merging two or more free-form contour regions, a user can select which application from the two or more free-form contour regions to display in the newly merged free-form contour region, or the contour engine 412 can automatically select the application based on an application priority, which application is most recently used, which application is most commonly used, or other criteria.

The contour learning engine 414 can identify a user's need of another application (i.e., a second application) while the user is using the first application and can cause the contour engine 412 to automatically create a free-form contour region. For example, if a user tends to define a free-form contour region to display a streaming music application while the user is using a navigation application, the contour learning engine 414 can learn this behavior and automatically cause the contour engine 412 to define and create the free-form contour region when the user initiates the navigation application. In other words, when the user initiates the navigation application, the contour learning engine 414 causes the contour engine 412 to automatically create a free-form contour region to display the music streaming application within the free-form contour region. The contour learning engine 414 can learn other behaviors of the user as well to predict what second application to display in the free-form contour region. For example, if the free-form contour region is drawn in the shape of a circle, the contour learning engine 414 may know, from a user's prior habits, to cause the contour engine 412 to open a clock application in the free-form contour region.

Figure 5:
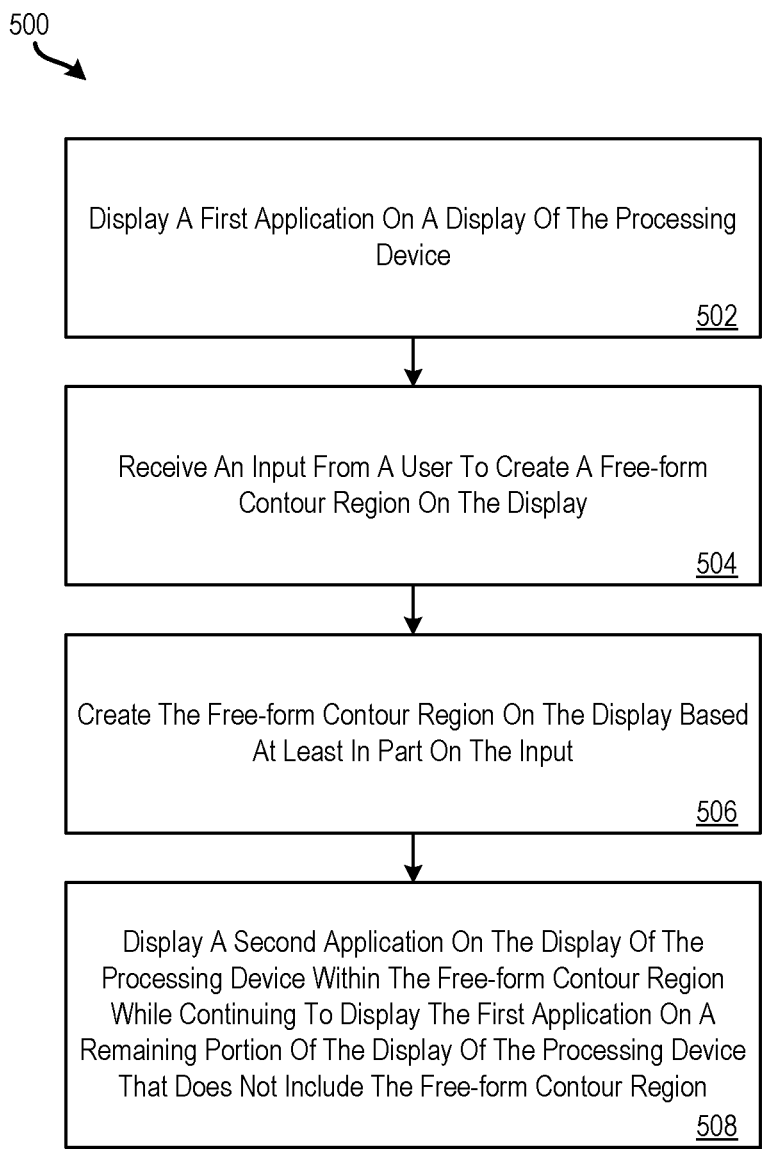
FIG. 5 depicts a flow diagram of a method for creating free-form contour regions on a display according to one or more embodiments described herein.

FIG. 5 depicts a flow diagram of a method 500 for creating free-form contour regions on a display according to one or more embodiments described herein. The method 500 can be performed by a suitable processing system and/or processing device, such as the processing system 300 of FIG. 3, the processing system 400 of FIG. 4, the processing device 402 of FIG. 4, and the like and/or combinations thereof.

Figure 6A:
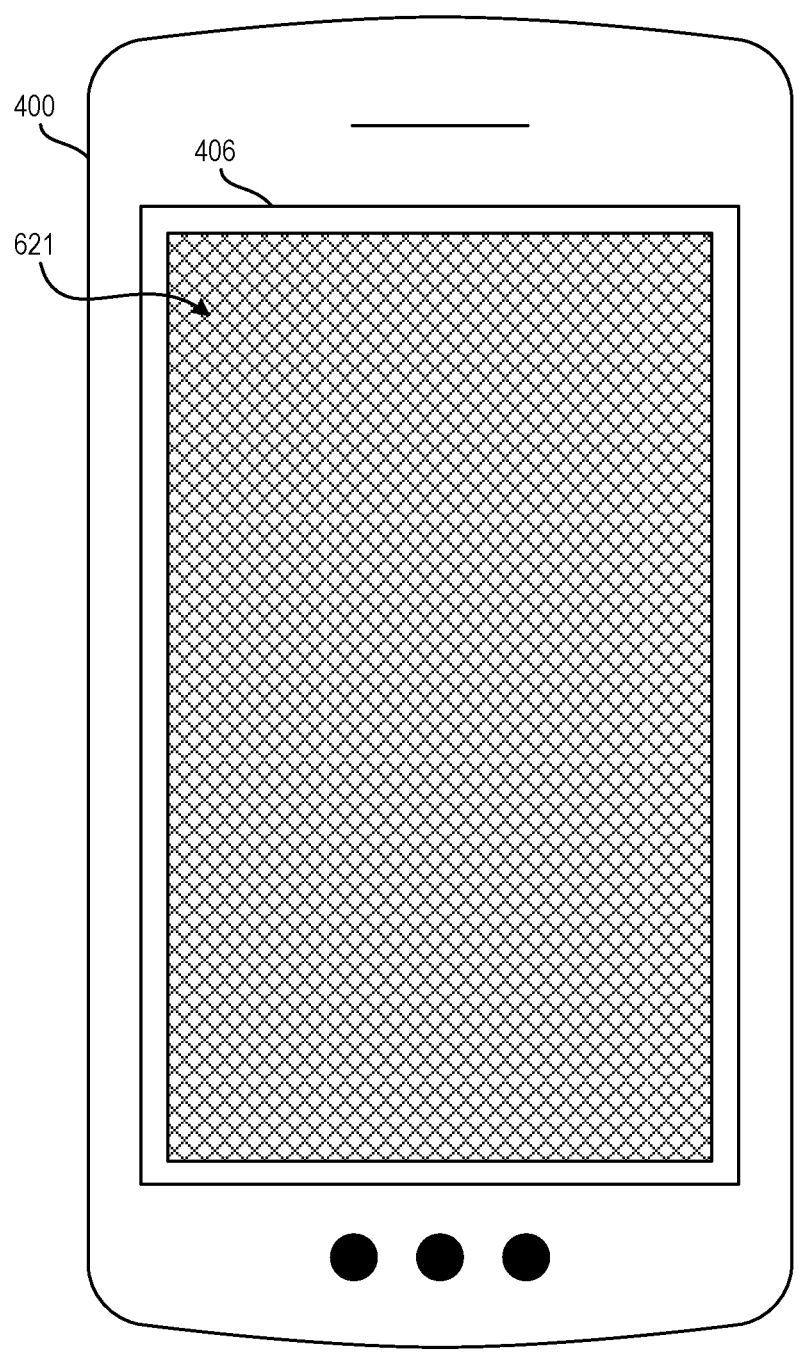
FIG. 6A depicts a processing system for creating free-form contour regions on a display of the processing system according to one or more embodiments described herein.
Figure 6B:
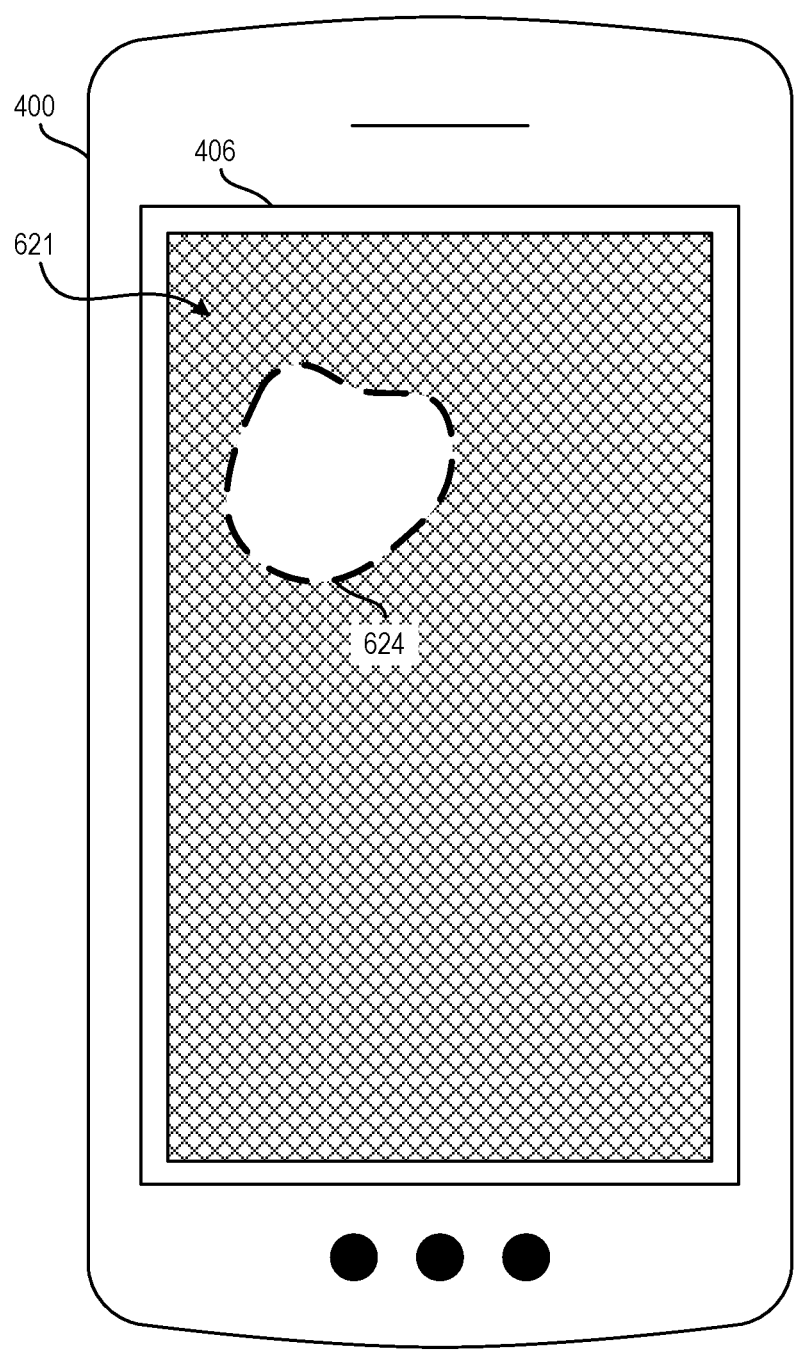
FIG. 6B depicts a processing system for creating free-form contour regions on a display of the processing system according to one or more embodiments described herein.
Figure 6C:
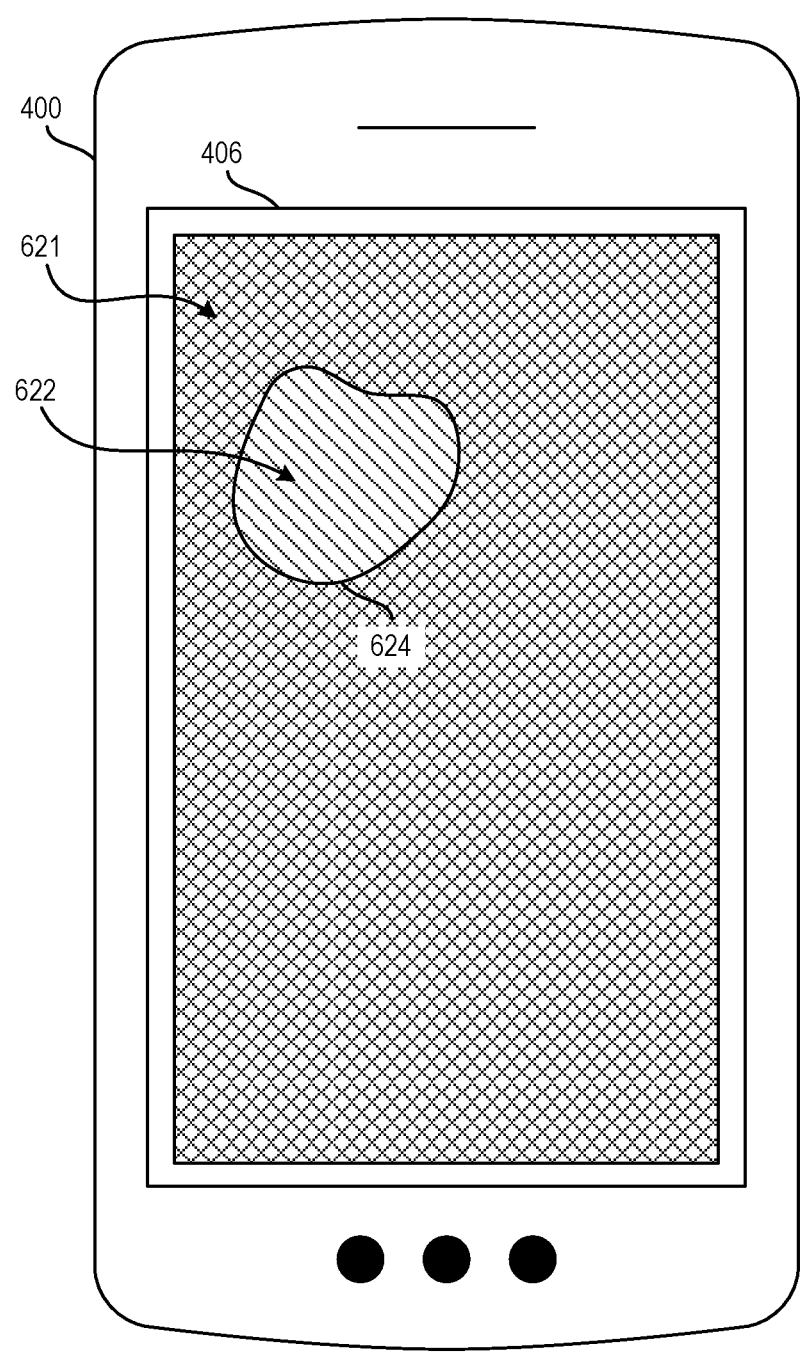
FIG. 6C depicts a processing system for creating free-form contour regions on a display of the processing system according to one or more embodiments described herein.

FIG. 5 is now described with reference to the blocks depicted in FIG. 4 and reference to FIGS. 6A, 6B, and 6C. In particular, FIG. 6A depicts the processing system 400 of FIG. 4 having a display 406 for displaying a first application 621 according to one or more embodiments described herein. FIG. 6B depicts the processing system 400 creating a free-form contour region 624 on the first application 621 according to one or more embodiments described herein. FIG. 6C depicts the processing system 400 displaying a second application 622 in the free-form contour region 624 on the first application 621 according to one or more embodiments described herein.

At block 502 of FIG. 5, the application engine 410 displays the first application 621 on the display 406 of the processing system 400. The first application 621 can be displayed as a graphical user interface.

At block 504, the contour engine 412 receives an input from a user to define a free-form contour region 624 on the display 406 (which may be, for example, on the first application 621). For example, the user can "draw" or otherwise provide input on the display 406 to define a free-form contour region 624 that is bounded by a boundary, designated by the dashed lines in FIG. 6B. The user can use a finger, mouse, stylus, digital pen/pencil, or another input device to define the free-form contour region 624. The free-form contour region 624 can be any suitable shape, as provided by the user. In some examples, the contour learning engine 414 can designate the shape (i.e., boundary) of the free-form contour region 624 based on historical user data, a type of the first application 621, a type of the second application 622, or other criteria, for example.

At block 506, the contour engine 412 creates the free-form contour region 624 on the display 406 based on the input. Once the free-form contour region 624 is created, the application engine 410, at block 508, displays the second application on the display 406 within the free-form contour region 624 while continuing to display the first application 621 on a remaining portion of the display that does not include the free-form contour region. In some examples, the user is prompted to select the second application 622 from a list of applications; however, the second application 622 can be selected automatically, for example, based on a shape of the free-form contour region, a previously used application, a frequently used application, etc. The second application 622 can be displayed as a graphical user interface.

Additional processes also may be included. For example, according to one or more embodiments described herein, the contour engine 412 receives a second input from the user to define a second free-form contour region (not shown) on one of the first application 621 and the second application 622. The contour engine 412 then creates the second free-form contour region on the one of the first application 621 and the second application 622. The application engine 410 then displays a third application on the display 406 of the processing system 400 within the second free-form contour region while displaying the second application 622 on the display 406 of the processing system 400 within the free-form contour region 624 and while continuing to display the first application 621 on a remaining portion of the display 406 of the processing system 400 that does not include the free-form contour region or the second free-form contour region. According to one or more embodiments described herein, the contour engine 412 can merge the free-form contour region 624 with the second free-form contour region.

In yet another embodiment described herein, the contour engine 412 can alter a shape, size, orientation, etc., of the free-form contour region 624 based on an additional user input received from the user. It should be understood that the process depicted in FIG. 5 represents an illustration, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   displaying, by a processing device, a first application on a display of a processing system;
   receiving, by the processing device, an input from a user to define a free-form contour region on the first application on the display;
   creating, by the processing device, the free-form contour region on the first application on the display based at least in part on the input; and
   displaying, by the processing device, a second application on the display of the processing system within the free-form contour region on the first application while continuing to display the first application on a remaining portion of the display of the processing system that does not include the free-form contour region.

2. The computer-implemented method of claim 1, wherein the input from the user defines a boundary of the free-form contour region.

3. The computer-implemented method of claim 1, wherein the free-form contour region is defined by a boundary.

4. The computer-implemented method of claim 1, wherein the free-form content region is a first free-form content region, the method further comprising:
   receiving, by the processing device, a second input from the user to define a second free-form contour region on one of the first application and the second application.

5. The computer-implemented method of claim 4, further comprising:
   creating, by the processing device, the second free-form contour region on the one of the first application and the second application.

6. The computer-implemented method of claim 5, further comprising:
   displaying, by the processing device, a third application on the display of the processing system within the second free-form contour region while continuing to display the second application on the display of the processing system within the first free-form contour region and while continuing to display the first application on a remaining portion of the display of the processing system that does not include the first free-form contour region or the second free-form contour region.

7. The computer-implemented method of claim 6, further comprising:
   merging the first free-form contour region with the second free-form contour region.

8. The computer-implemented method of claim 4, wherein the second input from the user defines a boundary of the second free-form contour region.

9. The computer-implemented method of claim 4, wherein the second free-form contour region is defined by a second boundary.

10. The computer-implemented method of claim 1, further comprising:
    altering, by the processing device, a shape of the free-form contour region based at least in part on a second input received from a user.

11. A processing system comprising:
    a display;
    a memory comprising computer readable instructions; and
    a processing device for executing the computer readable instructions for performing a method comprising:
    displaying, by the processing device, a first application on the display of the processing system;
    receiving, by the processing device, an input from a user to define a free-form contour region on the first application on the display;
    creating, by the processing device, the free-form contour region on the first application on the display based at least in part on the input; and
    displaying, by the processing device, a second application on the display of the processing system within the free-form contour region on the first application while continuing to display the first application on a remaining portion of the display of the processing system that does not include the free-form contour region.

12. The system of claim 11, wherein the input from the user defines a boundary of the free-form contour region.

13. The system of claim 11, wherein the free-form contour region is defined by a boundary.

14. The system of claim 11, wherein the free-form content region is a first-free-form content region, and wherein the method further comprises:

receiving, by the processing device, a second input from the user to define a second free-form contour region on one of the first application and the second application.

15. The system of claim 14, wherein the method further comprises:

creating, by the processing device, the second free-form contour region on the one of the first application and the second application.

16. The system of claim 15, wherein the method further comprises:

displaying, by the processing device, a third application on the display of the processing system within the second free-form contour region while continuing to display the second application on the display of the processing system within the first free-form contour region and while continuing to display the first application on a remaining portion of the display of the processing system that does not include the first free-form contour region or the second free-form contour region.

17. The system of claim 16, wherein the method further comprises:

merging the first free-form contour region with the second free-form contour region.

18. A computer program product comprising:

a computer readable storage medium having program instructions embodied therewith, the program instructions executable by a processing device to cause the processing device to perform a method comprising:

displaying, by the processing device, a first application on a display of a processing system;

receiving, by the processing device, an input from a user to define a free-form contour region on the first application on the display;

creating, by the processing device, the free-form contour region on the first application on the display based at least in part on the input; and displaying, by the processing device, a second application on the display of the processing system within the free-form contour region on the first application while continuing to display the first application on a remaining portion of the display of the processing system that does not include the free-form contour region.

\* \* \* \* \*